US012000627B2

(12) United States Patent
Torai

(10) Patent No.: US 12,000,627 B2
(45) Date of Patent: Jun. 4, 2024

(54) COOLING BLOCK AND INDUSTRIAL MAGNETRON

(71) Applicant: Hitachi Power Solutions Co., Ltd., Hitachi (JP)

(72) Inventor: Reiji Torai, Hitachi (JP)

(73) Assignee: Hitachi Power Solutions Co., Ltd., Hitachi (JP)

( * ) Notice: Subject to any disclaimer, the term of this patent is extended or adjusted under 35 U.S.C. 154(b) by 163 days.

(21) Appl. No.: 17/679,610

(22) Filed: Feb. 24, 2022

(65) Prior Publication Data

US 2022/0275975 A1 Sep. 1, 2022

(30) Foreign Application Priority Data

Mar. 1, 2021 (JP) ................................ 2021-031304

(51) Int. Cl.

| | |
|---|---|
| ***F25B 1/10*** | (2006.01) |
| ***F25B 5/02*** | (2006.01) |
| ***H01J 23/00*** | (2006.01) |
| ***H01J 25/50*** | (2006.01) |

(52) U.S. Cl.
CPC .................. *F25B 1/10* (2013.01); *F25B 5/02* (2013.01); *H01J 23/005* (2013.01); *H01J 25/50* (2013.01); *F25B 2400/13* (2013.01); *F25B 2400/23* (2013.01)

(58) Field of Classification Search
CPC .......... F25B 1/10; F25B 5/02; F25B 2400/13; F25B 2400/23; H01J 23/005; H01J 23/50; H01J 2225/50
See application file for complete search history.

(56) References Cited

U.S. PATENT DOCUMENTS

| | | | | |
|---|---|---|---|---|
| 2,615,143 | A | 10/1952 | Brown | |
| 3,800,182 | A * | 3/1974 | Wilczek | H01J 23/005 313/30 |
| 4,274,032 | A | 6/1981 | Dodonov et al. | |
| 5,328,585 | A * | 7/1994 | Stevenson | H01J 37/3455 204/192.12 |
| 5,493,178 | A | 2/1996 | Byram et al. | |
| 2018/0096815 | A1 | 4/2018 | Kamiyama et al. | |

FOREIGN PATENT DOCUMENTS

| | | | |
|---|---|---|---|
| DE | 10 2017 217 366 | A1 | 4/2018 |
| FR | 1 389 811 | A | 2/1965 |
| JP | 08222140 | A * | 8/1996 |
| JP | 2005-209426 | A | 8/2005 |

OTHER PUBLICATIONS

Partial European Search Report issued in European Application No. 22157041.9 dated Jul. 26, 2022 (19 pages).
Extended European Search Report issued in European Application No. 22157041.9 dated Oct. 25, 2022 (17 pages).

* cited by examiner

*Primary Examiner* — Miguel A Diaz
(74) *Attorney, Agent, or Firm* — Crowell & Moring LLP

(57) ABSTRACT

Provided is a cooling block formed in a columnar shape in an outer periphery of an anode cylindrical body of a high power industrial magnetron, in which the cooling block includes, at different positions in a vertical direction, two or more flow paths through which refrigerant flows, and the flow paths closest to each other in the vertical direction are connected to each other by at least one or more connection flow paths in the cooling block.

9 Claims, 8 Drawing Sheets

COOLING BLOCK AND INDUSTRIAL MAGNETRON

CLAIM OF PRIORITY

The present application claims priority from Japanese Patent application serial No. 2021-31304, filed on Mar. 1, 2021, the content of which is hereby incorporated by reference into this application.

BACKGROUND OF THE INVENTION

1. Field of the Invention

The present invention relates to a cooling block and an industrial magnetron.

2. Description of the Related Art

The magnetron includes a high-voltage DC power supply that generates a high voltage to be applied between a cathode and an anode, a power supply that heats a filament for emitting electrons to a specified temperature, a control circuit thereof, a waveguide for extracting microwave energy, a housing that houses them, and the like.

When the magnetron outputs microwaves, heat is generated. It is necessary to cool an anode cylindrical body by an appropriate cooling method according to a calorific value thereof. For example, in the case of a domestic magnetron or a low power type magnetron (for low power) having an output of about 2 kW out of an industrial magnetron having an output of 2 to 10 kW, an air cooling type cooling method can be used. However, in the case of a higher output type magnetron (for high power), a water cooling type cooling method having a larger cooling effect is required because a sufficient cooling effect cannot be obtained by the air cooling type.

JP 2005-209426 A discloses a magnetron including a cooling block disposed in close contact with an outer peripheral wall of an anode cylinder and having a plurality of cooling medium flow paths therein along a tube axis direction of the anode cylinder, in which one of open ends of an upper-stage conduit and one of open ends of a lower-stage conduit of the plurality of flow paths are connected by a pipe joint.

SUMMARY OF THE INVENTION

The cooling block of the magnetron described in JP 2005-209426 A is provided with a pipe joint in addition to a feeding port for supplying a cooling medium and a discharge port for discharging the cooling medium. Since an external component such as the pipe joint may cause liquid leakage at a connection portion, it is desirable to reduce the external component as much as possible.

An object of the present invention is to provide a cooling block that cools a high power industrial magnetron, and the industrial magnetron using the cooling block, in which the cooling block includes inside the cooling block a predetermined number of refrigerant flow paths in which refrigerant flows around the anode cylindrical body, and a connection flow path connecting the refrigerant flow paths, and cools the anode cylindrical body.

The cooling block of the present invention is a cooling block formed in a columnar shape in an outer periphery of an anode cylindrical body of a high power industrial magnetron, in which the cooling block includes, at different positions in a vertical direction, two or more flow paths through which refrigerant flows, and the flow paths closest to each other in the vertical direction are connected to each other by at least one or more connection flow paths in the cooling block.

According to the present invention, even when the refrigerant is supplied to the flow path at a large discharge pressure, liquid leakage or the like does not occur, and further it is possible to secure appropriate cooling capacity according to the output.

DESCRIPTION OF THE PREFERRED EMBODIMENTS

Hereinafter, embodiments of the present disclosure will be described with reference to the drawings.

Figure 1:
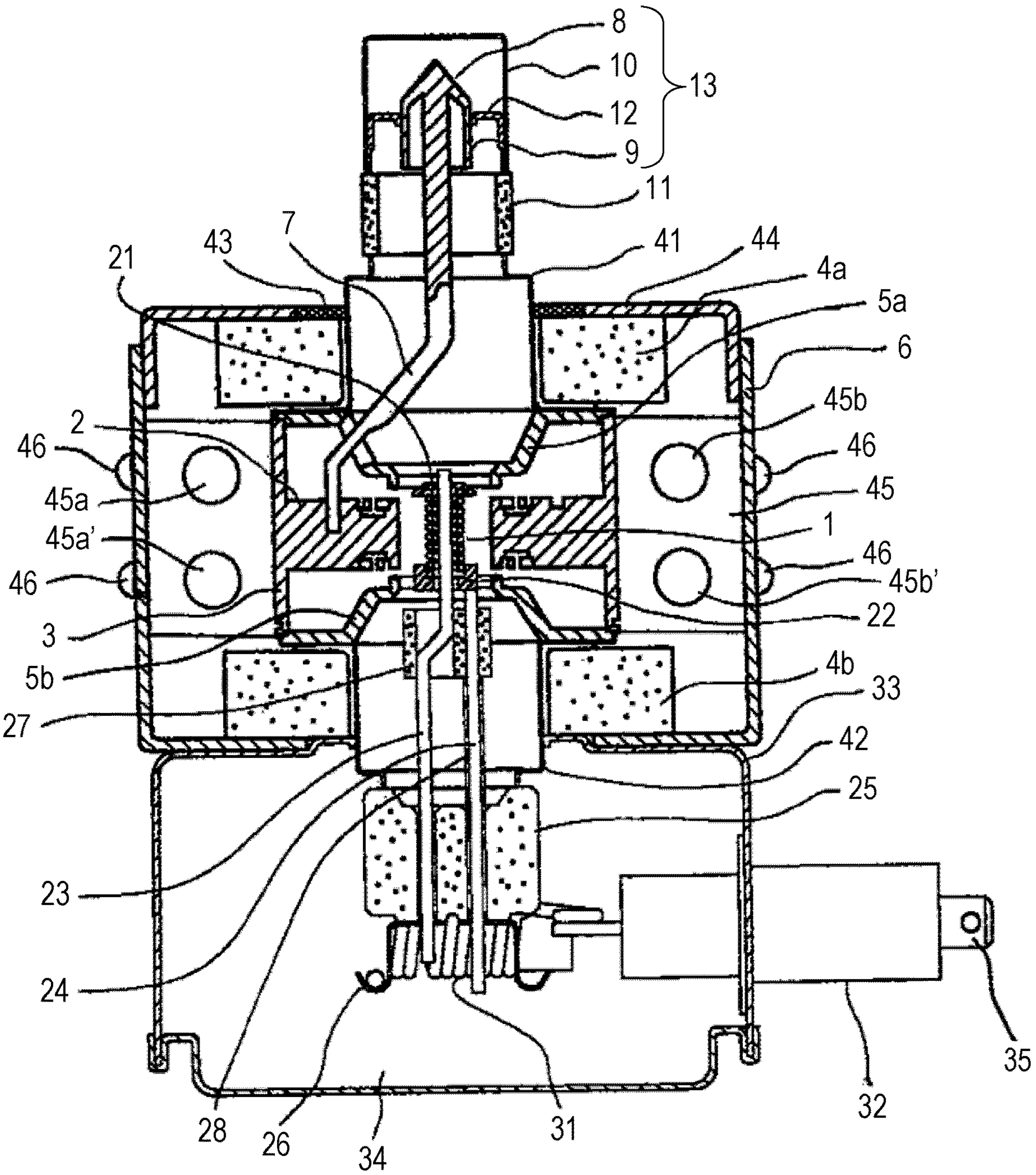
FIG. 1 is a cross-sectional view illustrating an example of a magnetron.

FIG. 1 is a cross-sectional view illustrating an example of a magnetron.

In the drawing, the magnetron includes a cathode filament 1 formed in a spiral shape as a heat emission source, a plurality of anode vanes 2 arranged around the cathode filament 1, an anode cylinder 3 (anode cylindrical body) supporting the anode vane 2, and a pair of permanent magnets 4*a* and 4*b* having an annular shape and arranged at upper and lower ends of the anode cylinder 3. The anode vane 2 and the anode cylinder 3 are integrated by fixing such as brazing, or an extrusion molding method, and constitute a part of an anode.

The plurality of anode vanes 2 are arranged radially around the cathode filament 1. An active space is formed between the cathode filament 1 and the anode vane 2. A region surrounded by two adjacent anode vanes 2 and the anode cylinder 3 is a resonant cavity.

A pair of magnetic poles 5*a* and 5*b* made of a ferromagnetic material such as soft iron are respectively arranged between the anode cylinder 3 and the permanent magnets 4*a* and 4*b*.

An antenna lead 7 is electrically connected to the anode vane 2. The other end of the antenna lead 7 is sealed and cut together with an exhaust pipe 8. The antenna lead 7 and exhaust pipe 8 are electrically connected to each other. The exhaust pipe 8 constitutes a magnetron antenna 13 together with a choke 9, an antenna cover 10, and an exhaust pipe support 12. The magnetron antenna 13 is supported by a cylindrical insulator 11.

The cathode filament 1 is connected to a center lead 23 which is a cathode lead, and a side lead 24. In addition, an upper end shield 21, a lower end shield 22, an input side ceramic 25, a cathode terminal 26, and a spacer 27 are arranged around the cathode filament 1. The spacer 27 has a function of preventing disconnection of the cathode filament 1. The spacer 27 is fixed at a predetermined position by a sleeve 28. These components constitute a cathode. A yoke 6 is disposed around the cathode.

A choke coil 31 is connected to one end of a feedthrough capacitor 32. The feedthrough capacitor 32 is attached to a filter case 33 of an input unit. A cathode heating conductive wire 35 is provided at the other end of the feedthrough capacitor 32, and the feedthrough capacitor 32 is connected to a power supply via the cathode heating conductive wire 35.

The filter case 33 is closed at high frequency by a lid body 34 at a bottom portion thereof. Cap-shaped upper and lower end sealing metals 41 and 42 and a metal gasket 43 are electrically connected to an upper yoke 44.

A cooling block 45 is disposed in close contact with an outer peripheral wall of the anode cylinder 3. The cooling block 45 is made of an aluminum material (Al) having high thermal conductivity and high processability. Inside the cooling block 45, upper stage flow paths 45*a* and 45*b* and lower stage flow paths 45*a*' and 45*b*' through which a cooling medium (refrigerant) flows are provided. The cooling block 45 is fixed to the yoke 6 with a plurality of mounting screws 46. The cooling block 45 may be made of a copper material (Cu) instead of the aluminum material.

Note that water, particularly pure water or ion-exchanged water, is usually suitably used as the refrigerant. The refrigerant may be a coolant (an aqueous solution containing ethylene glycol) or the like.

The present invention is a cooling block formed in a columnar shape on in outer periphery of an anode cylindrical body of a high power industrial magnetron, in which the cooling block includes at different positions in a vertical direction two or more flow paths through which refrigerant flows, and the flow paths closest to each other in the vertical direction are connected to each other by at least two or more connection flow paths in the cooling block.

The present invention will be described in detail below.

The cooling block according to the present invention is disposed in the outer periphery of the anode cylindrical body of the magnetron, which is configured to include a high-voltage DC power supply that generates a high voltage to be applied between a cathode and an anode, a power supply that heats a filament for emitting electrons to a specified temperature, a control circuit thereof, a waveguide for extracting microwave energy, a housing that houses them, and the like, and the cooling block is formed in a columnar shape. Note that in terms of manufacturing processing, the cooling block employs a quadrangular prism.

Inside the cooling block, there are at different positions in the vertical direction two or more flow paths through which the refrigerant flows. The different position in the vertical direction is a vertical positional relationship, and an uppermost position is an upper stage, a lowermost position is a lower stage, and an intermediate position thereof is an intermediate stage.

First, a case where there are two flow paths (an upper stage flow path and a lower stage flow path) will be described with reference to FIGS. 2 and 3.

These flow paths are arranged in a U shape so as to surround the outer peripheral surface of the anode cylindrical body, and the respective flow paths are arranged at predetermined intervals in the vertical direction.

Ends of the upper stage flow path and the lower stage flow path are arranged on the same side of the cooling block.

One end of the upper (lower) flow path is open as a start end, and is used as a connection port for connecting to a refrigerant storage tank disposed outside, and the other end is a terminal end and is not open but closed.

The upper stage flow path and the lower stage flow path are connected to each other by the connection flow path. Note that it is preferred that the connection flow path is connected at the shortest distance, that is, the connection flow path is connected perpendicular to both the upper stage flow path and the lower stage flow path.

Figure 2:
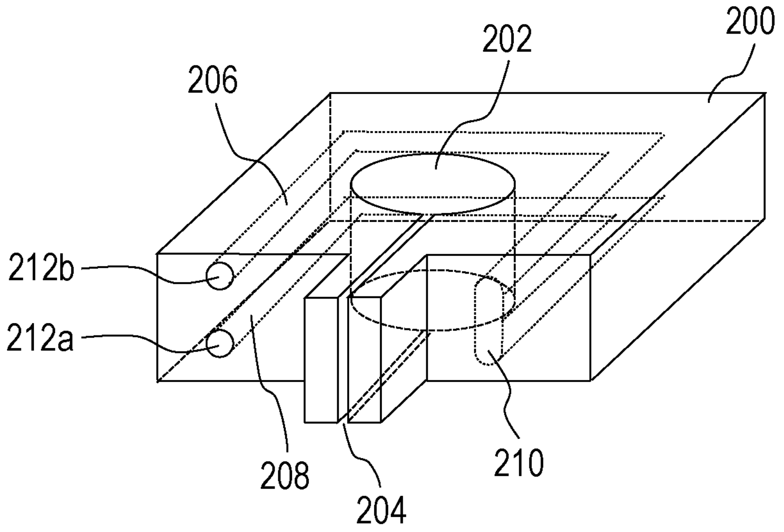
FIG. 2 is a perspective view illustrating a cooling block having a sequential-type two stage flow path configuration.

FIG. 2 illustrates a two stage flow path configuration (sequential type) in which the upper stage flow path and the lower stage flow path are connected by one connection flow path.

In this figure, a cooling block 200 is a quadrangular prism-shaped aluminum material, and has an anode cylindrical body insertion portion 202 (a space or a through-hole) and a slit 204 (a gap).

Protrusions provided on both sides of the slit 204 are used to pass a bolt through the protrusions and fasten the bolt in order to bring the outer peripheral wall of the anode cylindrical body and the cooling block 200 into close contact with each other. Note that the cooling block 200 may be manufactured without providing the slit 204 and the protrusions.

Note that the cooling block 200 may be a columnar body having another cross-sectional shape (for example, a circle), but is desirably a quadrangular prism because manufacturing including processing such as drilling is easy.

In the following description, for convenience, a direction of a central axis of the columnar body, that is, a direction of a central axis of the anode cylindrical body insertion portion 202 is referred to as a “vertical direction”. However, this is merely a convenient expression, and the central axis may be in a horizontal direction with reference to a direction of gravity or in an oblique direction with respect to the vertical direction depending on a method of installing the cooling block 200.

Inside the cooling block 200, an upper stage flow path 206 and a lower stage flow path 208 (two refrigerant flow paths) are provided at different positions (heights) in the vertical direction. The upper stage flow path 206 has a connection port 212*b*, and the lower stage flow path 208 has a connection port 212*a*. The upper stage flow path 206 and the lower stage flow path 208 are formed in a U shape such that central axes of the flow paths are respectively located on the same horizontal plane. The upper stage flow path 206 and the lower stage flow path 208 are desirably arranged such that the U shapes overlap each other when the cooling block 200 is viewed from above.

The connection port 212*a* and the connection port 212*b* are openings of the refrigerant flow path, and are ends of the refrigerant flow path. The connection port 212*a* and the connection port 212*b* are provided on the same side surface of the quadrangular prism-shaped cooling block 200.

The upper stage flow path 206 and the lower stage flow path 208 are connected by a connection flow path 210 provided inside the cooling block 200. The connection flow path 210 is connected to ends opposite to the connection port 212*a* and the connection port 212*b* which are ends of the upper stage flow path 206 and the lower stage flow path 208. The connection flow path 210 is desirably disposed in the vertical direction so as to be perpendicular to the upper stage flow path 206 and the lower stage flow path 208 which are arranged in the horizontal direction. In this case, the connection flow path 210 is the shortest. However, the direction of the connection flow path 210 is not limited thereto, and may be disposed obliquely with respect to the vertical direction.

In this figure, with the above-described configuration, the upper stage flow path 206 and the lower stage flow path 208 are configured to be connected in series by the connection flow path 210.

The cooling block 200 illustrated in this figure has a configuration in which the refrigerant circulates in the upper stage flow path or the lower stage flow path and then circulates in the lower stage flow path or the upper stage flow path through the connection flow path. Therefore, a point that the refrigerant flows through the refrigerant flow path in a sequential order is similar to a configuration of JP 2005-209426 A. However, since the refrigerant passes through the connection flow path 210 provided inside the cooling block 200, it is not necessary to provide a pipe joint outside the cooling block. Therefore, the number of components in the opening of the cooling block can be reduced, and risk of liquid leakage of the refrigerant can be reduced.

Figure 3:
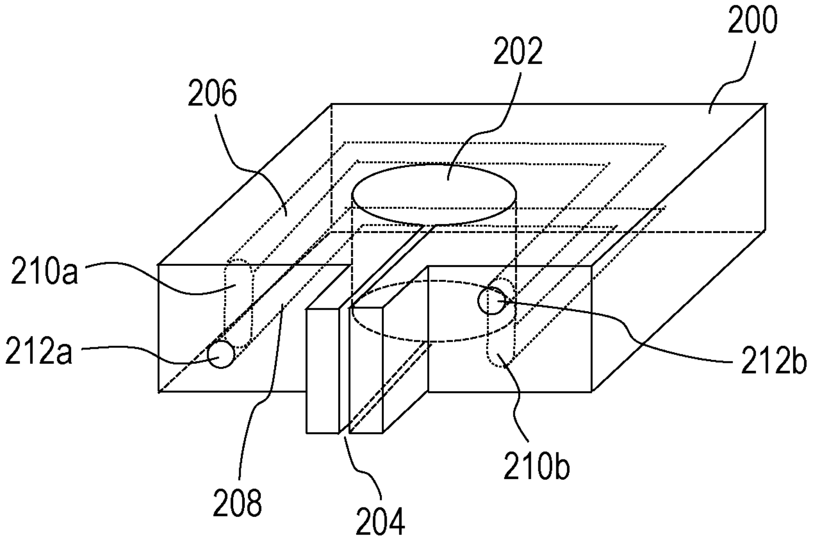
FIG. 3 is a perspective view illustrating the cooling block having a dividing-and-merging type two stage flow path configuration.

FIG. 3 is a perspective view illustrating the cooling block having a dividing-and-merging type two stage flow path configuration in which the upper stage flow path and the lower stage flow path are connected by two connection flow paths (the cooling block provided with two connection flow paths).

In this figure, a configuration of the anode cylindrical body insertion portion 202 and the slit 204 of the cooling block 200 is the same as in FIG. 2, but the cooling block 200 is different from that in FIG. 2 in a configuration of the upper stage flow path 206 and the lower stage flow path 208, and the connection ports 212*a* and 212*b*, and in that two connection flow paths 210*a* and 210*b* are provided.

In FIG. 3, when the refrigerant is introduced from the connection port 212*a* of the lower stage flow path 208, the cooling block 200 has a configuration (a configuration connected in parallel) in which the refrigerant is divided into the upper stage flow path 206 and the lower stage flow path 208 by a connection flow path 210*a* (a first connection flow path), and the divided refrigerant is merged by a connection flow path 210*b* (a second connection flow path). The connection flow paths 210*a* and 210*b* are desirably are arranged in the vertical direction so as to be perpendicular to the upper stage flow path 206 and the lower stage flow path 208 which are arranged in the horizontal direction. In this case, the connection flow paths 210*a* and 210*b* are the shortest. However, the direction of the connection flow paths 210*a* and 210*b* is not limited to this, and the connection flow paths may be arranged obliquely with respect to the vertical direction.

In this figure, the connection ports 212*a* and 212*b* are separately arranged in two surfaces divided by the slit 204 unlike a configuration of FIG. 2, in the side surface of the cooling block 200 having the slit 204.

Note that arrangement of the two connection flow paths 210*a* and 210*b* is arbitrary, and a desired cooling effect can be changed by this arrangement. However, normally, it is desirable to arrange the connection flow paths 210*a* and 210*b* near the connection ports 212*a* and 212*b*. Specifically, a distance between central axes of the connection flow paths 210*a* and 210*b* and the connection ports 212*a* and 212*b* is desirably twice or less a diameter of the connection flow paths 210*a* and 210*b*. From the viewpoint of strength of the cooling block 200, if the connection flow paths 210*a* and 210*b* have a wall thickness that is not damaged by a pressure of the refrigerant, they may be brought close to the connection ports 212*a* and 212*b* (an outer wall surface) of the cooling block 200, and the distance may be 1 times or less of the diameter.

With such a configuration, the refrigerant flowing through the upper stage flow path 206 and the lower stage flow path 208 flows around the anode cylindrical body in parallel, and the cooling effect can be enhanced. Further, the refrigerant is divided at a position before being thermally affected inside the cooling block, so that the refrigerant flowing through the upper stage flow path and the lower stage flow path can independently flows around the anode cylindrical body without interfering with each other, and the cooling effect can be maximally secured.

Furthermore, comparing FIG. 2 and FIG. 3, there are the following differences.

In the configuration of FIG. 2, the cooling effect is not as high as that of the configuration of FIG. 3, but since the number of connection flow paths is small, manufacturing cost can be suppressed. On the other hand, in the configuration of FIG. 3, the cooling effect is high, but the manufacturing cost is higher than that in the configuration of FIG. 2. Therefore, which structure is to be employed may be determined based on a relationship between required cooling effect and the manufacturing cost.

In both the configuration of FIG. 2 and the configuration of FIG. 3, there are two connection ports with an external component, and probability of liquid leakage of the refrigerant is low and the cost is low as compared with the configuration described in JP 2005-209426 A.

When an output of the magnetron is large, since a calorific value from the anode cylindrical body also increases, it is necessary to enhance the cooling effect by the cooling block. In order to enhance the cooling effect, it is conceivable, for example, to increase a cross-sectional area of the refrigerant flow path to increase a refrigerant flow rate per unit time, or to increase the number of refrigerant flow paths in the flow path having the same cross-sectional area to increase a heat transfer area.

When the cross-sectional area of the refrigerant flow path is increased, the refrigerant flow rate per unit time can be increased, but since the refrigerant flow path is cut with a drill due to the manufacturing processing, the cross section is circular, and the effect is small from the viewpoint of the heat transfer area.

On the other hand, when the number of refrigerant flow paths is increased, the refrigerant flow rate per unit time per flow path does not change, but the heat transfer area increases in proportion to the number of flow paths. In addition, the cooling effect can be enhanced because an area directly facing the refrigerant flowing at a position close to the anode cylindrical body is increased.

Therefore, it is desirable to increase the number of refrigerant flow paths depending on the calorific value of the magnetron.

Further, cooling capacity of the cooling block is changed depending on the calorific value of the magnetron by the number of intermediate flow paths arranged at intermediate positions in the vertical direction between the upper stage flow path and the lower stage flow path. It can also be said that the industrial magnetron further includes the intermediate flow path at the intermediate position between an introduction flow path and a discharge flow path.

Next, the arrangement of the connection flow paths when three or more stages of refrigerant flow paths are arranged (when the upper stage flow path, the intermediate flow path (hereinafter also referred to as an "intermediate stage flow path"), and the lower stage flow path are provided) will be described.

Figure 4:
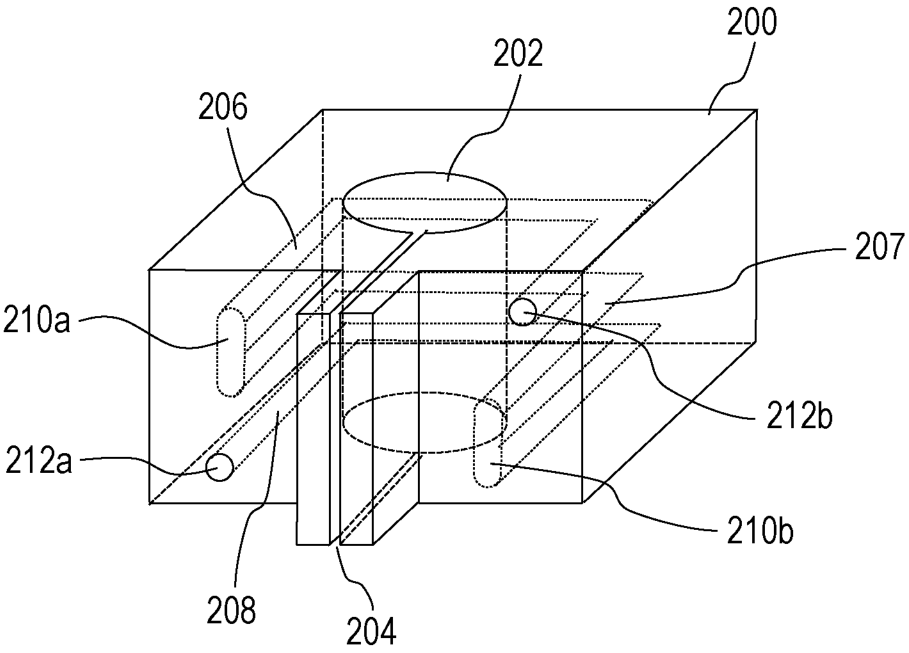
FIG. 4 is a perspective view illustrating the cooling block having a sequential-type three stage flow path configuration.

FIG. 4 illustrates a three stage flow path configuration (sequential type) in which a first (second) connection flow path is provided and connected to a portion connecting the upper stage flow path and the intermediate stage flow path, and a second (first) connection flow path is provided and connected to a portion connecting the intermediate stage flow path and the lower stage flow path.

In this figure, the upper stage flow path 206, an intermediate stage flow path 207, and the lower stage flow path 208 (three refrigerant flow paths) are provided at different positions (heights) in the vertical direction inside the cooling block 200. The upper stage flow path 206 has a connection port 212*b*, and the lower stage flow path 208 has a connection port 212*a*. The upper stage flow path 206, the intermediate stage flow path 207, and the lower stage flow path 208 are formed in a U shape such that central axes of the flow paths are located on the same horizontal plane.

The upper stage flow path 206 and the intermediate stage flow path 207 are connected by the connection flow path 210*a* (first connection flow path) provided in the vertical direction inside the cooling block 200. The intermediate stage flow path 207 and the lower stage flow path 208 are connected by the connection flow path 210*b* (second connection flow path) provided in the vertical direction inside the cooling block 200.

Therefore, in this figure, the upper stage flow path 206, the intermediate stage flow path 207, and the lower stage flow path 208 are connected in series by the connection flow paths 210*a* and 210*b* to constitute one flow path. With regard to this configuration, it can be said that both ends of the intermediate stage flow path 207 (intermediate flow path) are closed.

Also in such a three stage flow path configuration, similarly to the two stage flow path configuration, an external pipe joint as the connection flow path is not necessary, there are two connection ports with the external component, and the probability of liquid leakage of the refrigerant is low and the cost is low as compared with the configuration described in JP 2005-209426 A.

In this configuration, the refrigerant circulates in the upper stage (lower stage) flow path, then circulates in the intermediate stage flow path through the connection flow path, and further circulates in the lower stage (upper stage) flow path through the connection flow path, and this configuration is the same as a known technique in that the refrigerant sequentially flows. However, since the external pipe joint is not necessary by passing through the connection flow path provided inside the cooling block, the risk of liquid leakage of the refrigerant can be reduced by reducing the number of components in the opening of the cooling block.

Figure 5:
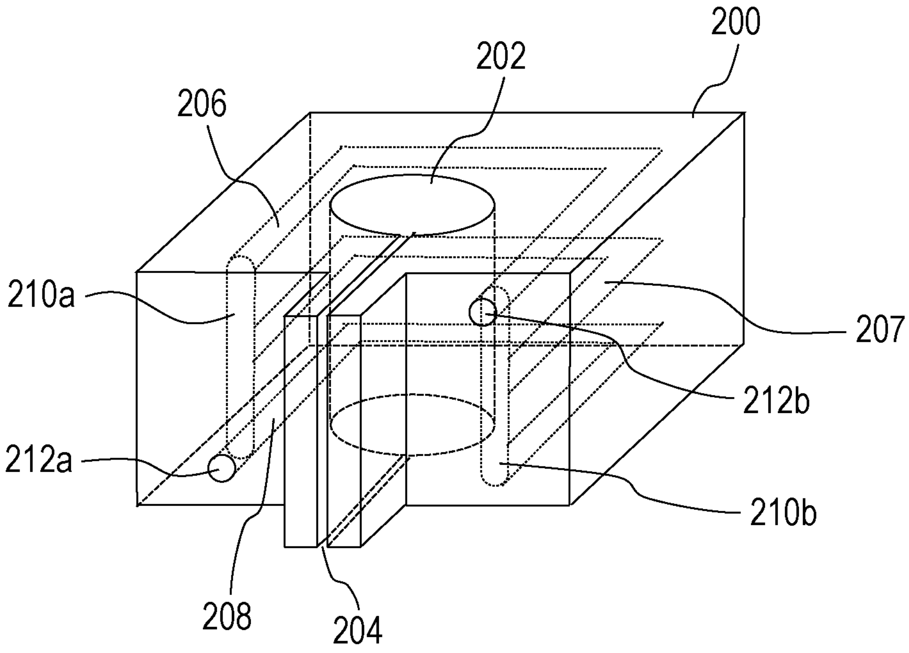
FIG. 5 is a perspective view illustrating the cooling block having a dividing-and-merging type three stage flow path configuration.

FIG. 5 illustrates a three stage flow path configuration (dividing-and-merging type) in which a first (second) connection flow path is provided in the vicinity of a connection port for introducing the refrigerant into the cooling block (at a position before the refrigerant is thermally affected inside the cooling block), and a second (first) connection flow path is provided in the vicinity of a connection port for discharging the refrigerant to outside the cooling block (at a position after the refrigerant flows around the anode cylindrical body).

In this figure, when the refrigerant is introduced from the connection port 212*a* of the lower stage flow path 208, the cooling block 200 has a configuration (a configuration connected in parallel) in which the refrigerant is divided into three of the upper stage flow path 206, the intermediate stage flow path 207, and the lower stage flow path 208 by the connection flow path 210*a* (the first connection flow path), and the divided refrigerant is merged by the connection flow path 210*b* (the second connection flow path).

According to the same concept as in the configuration of this figure, even in a configuration in which the number of the intermediate stage flow paths is further increased to have two or more intermediate stage flow paths, that is, in a four or more stage flow path configuration, a dividing position and a merging position of the refrigerant are not changed, and the refrigerant can be distributed to the respective flow paths.

In this configuration, the upper stage, intermediate stage, and lower stage flow paths are connected by the first (second) connection flow path, the refrigerant is divided into the upper stage, intermediate stage, and lower stage flow paths before flowing around the anode cylindrical body, the upper stage, intermediate stage, and lower stage flow paths are connected by the second (first) connection flow path, and the refrigerant is merged after flowing around the anode cylindrical body. Accordingly, the respective flow paths can independently cool the anode cylindrical body without interfering with each other.

The configuration in which the refrigerant flow paths are connected to each other outside the cooling block as in JP 2005-209426 A is such that the refrigerant flows sequentially in each flow path, that is, in the order of upper stage (lower stage), intermediate stage, and lower stage (upper stage), and an increase in the cooling effect due to an increase in the flow paths cannot be expected.

According to the configuration of the present invention, even when the number of intermediate flow paths is further increased to have the four or more stage flow path configuration, the dividing position and the merging position of the refrigerant are not changed, and the respective flow paths can independently cool the anode cylindrical body without interfering with each other.

Note that which one of the flow path configuration of the sequential type as illustrated in FIG. 4 and the flow path configuration of the dividing-and-merging type as illustrated in FIG. 5 is selected depends on a balance between the calorific value of the entire anode cylindrical body and a discharge pressure of a refrigerant supply device. Since these configurations can be selected, an appropriate cooling capacity can be ensured according to the output of the magnetron in design.

Figure 6:
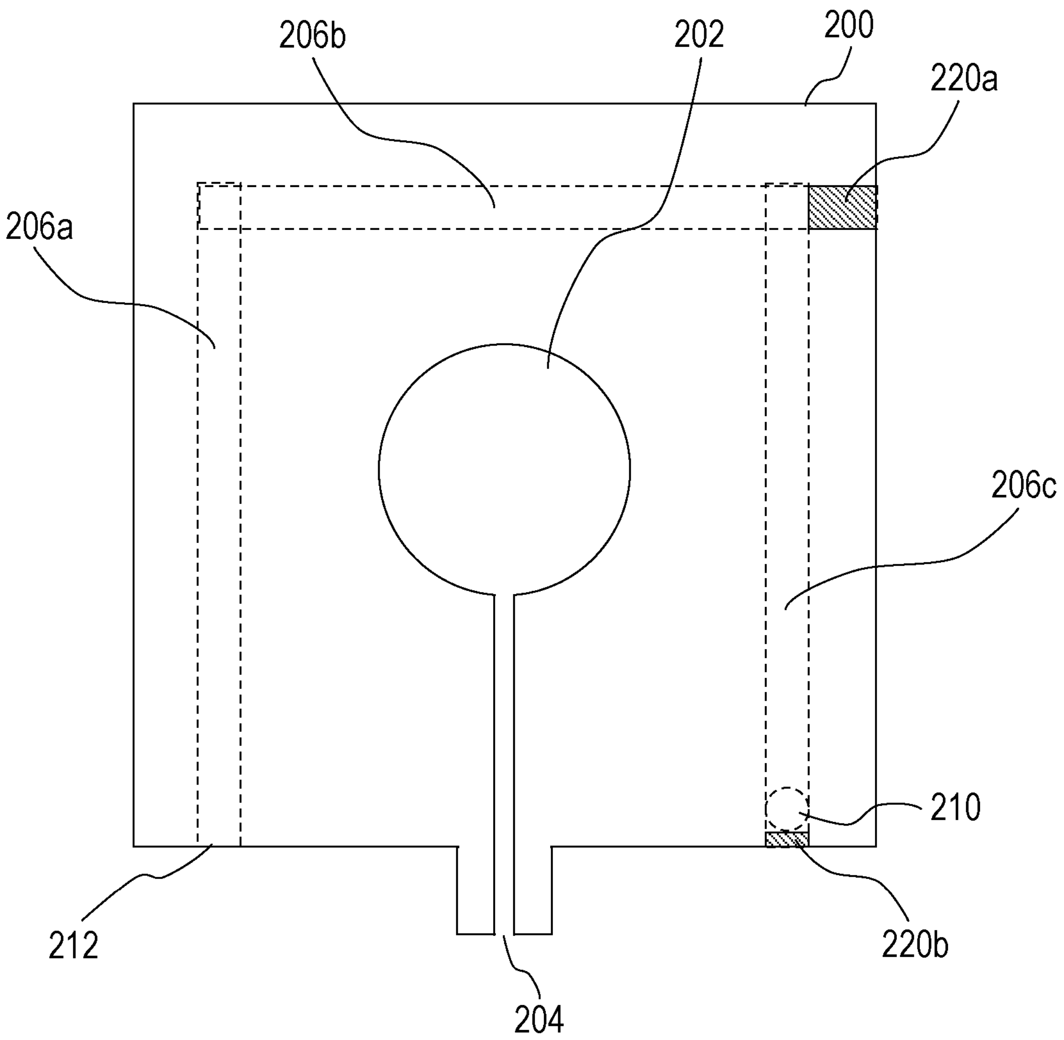
FIG. 6 is a plan view illustrating details of a structure of a refrigerant flow path and a connection flow path.

FIG. 6 illustrates processing and formation of the flow path for the refrigerant flow path (upper stage, intermediate stage, lower stage) and the connection flow path.

As illustrated in this figure, the upper stage flow path 206 of FIG. 2 and the like is formed as one flow path by connecting linear flow paths 206*a*, 206*b*, and 206*c*. Each of the linear flow paths 206*a*, 206*b*, and 206*c* is formed by cutting processing with the drill. The intermediate stage flow path 207 and the lower stage flow path 208 in FIG. 4 and the like are also formed at different positions in the vertical direction by the same cutting processing. Note that intervals between the upper stage flow path 206, the intermediate stage flow path 207, and the lower stage flow path 208 is appropriately set in consideration of the calorific value and the like of the anode cylindrical body at design stage.

The linear flow paths 206*a*, 206*b*, and 206*c* are formed by cutting processing with the drill from one side surface of the cooling block 200. At this time, the cutting processing is performed so that a tip of the drill does not penetrate a side surface facing the one side surface (for example, the linear flow path 206*a*).

Subsequently, the cutting processing is similarly performed at a predetermined position (at the same height in the vertical direction) on a side surface adjacent to (a side surface perpendicular to) the one side surface (the linear flow path 206*b*). In this case, the cutting processing is performed such that the linear flow path 206*b* is connected to the rearmost portion of the linear flow path 206*a*.

Similarly, the linear flow path 206*c* is cut and processed to be connected to the vicinity of an inlet of the linear flow path 206*b*.

Through the above processing, the linear flow paths 206*a*, 206*b*, and 206*c* communicate with each other, and a U-shaped flow path (the upper stage flow path 206 in FIG. 2 and the like) is formed.

Similarly, the lower stage flow path 208 in FIG. 2 and the like is also formed.

Subsequently, the connection flow path 210 is formed by cutting processing with the drill from an upper bottom surface or a lower bottom surface of the cooling block 200. Thus, the upper stage flow path 206 and the lower stage flow path 208 communicate with each other.

Finally, termination processing is performed to close openings other than the connection port 212 for introducing the refrigerant and the connection port (not illustrated) for recovering the refrigerant with closing members 220*a* and 220*b*. Note that as the closing members 220*a* and 220*b*, screw members are desirably used for being embedded to an appropriate position. Specifically, sinking plugs are desirably used as the closing members 220*a* and 220*b*, and by using the sinking plugs wound with a seal tape, the liquid leakage can be prevented even when the pressure of the refrigerant is high, and a highly reliable product can be obtained. By using the sinking plug, it is easy to remove the sinking plug and clean an inside of the flow path, for example when foreign matter or the like remains in the flow path of the cooling block 200 and a flow path resistance increases. However, it is also conceivable to fix the closing members 220*a* and 220*b* by welding. This is because the welding can more reliably prevent liquid leakage.

Although the above-described processing and assembling method has been described in the case of the three stage flow path configuration, the same applies to the case of the two stage flow path configuration and the case of the four or more stage flow path configuration.

Figure 7:
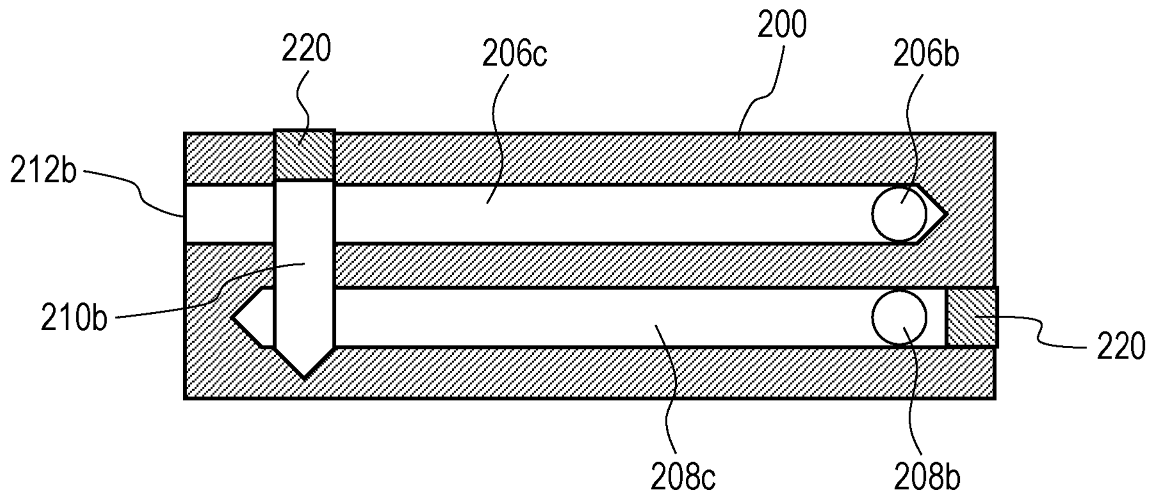
FIG. 7 is a vertical cross-sectional view illustrating the cooling block having the dividing-and-merging type two stage flow path configuration.

FIG. 7 is a vertical cross-sectional view illustrating the cooling block having the dividing-and-merging type two stage flow path configuration.

This figure illustrates a cross section passing through center lines of the linear flow path 206*c* (upper stage flow path) and the linear flow path 208*c* (lower stage flow path).

In this figure, the cutting processing by the drill is performed from the left side in the figure with respect to the linear flow path 206*c*, from the right side in the figure with respect to the linear flow path 208*c*, and from an upper surface of the cooling block with respect to the connection flow path 210*b*. The linear flow path 208*c* and the connection flow path 210*b* are closed by closing members 220. An end of the linear flow path 206*c* is a connection port 212*b*. The linear flow path 206*b* is vertically connected to the linear flow path 206*c*, and a linear flow path 208*b* is vertically connected to a linear flow path 208*c*.

Figure 8:
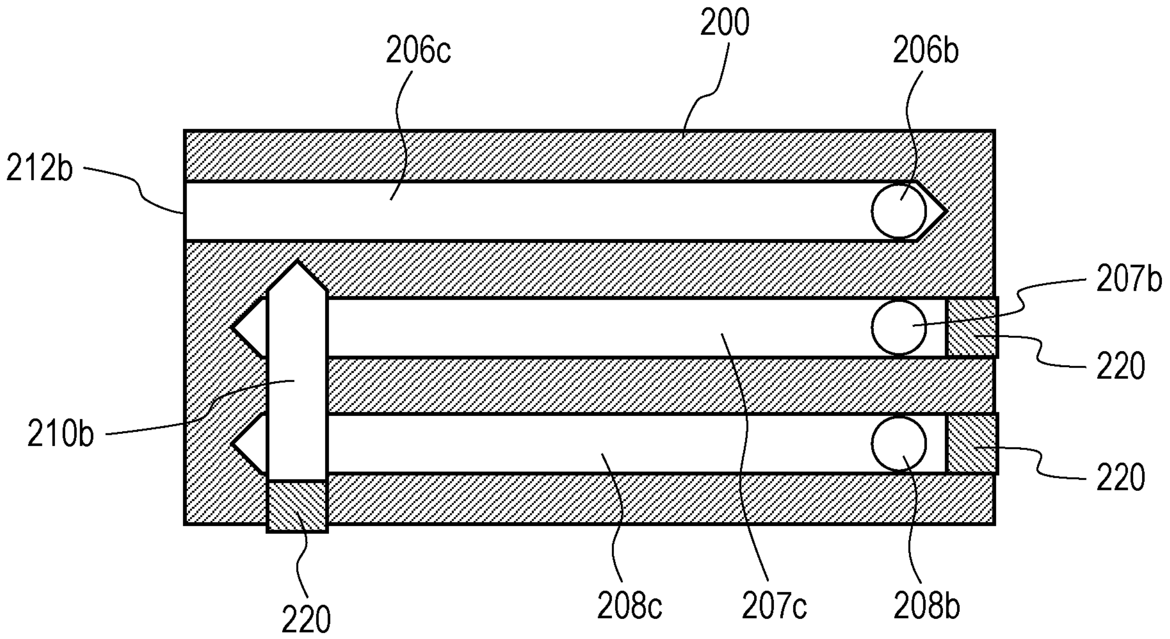
FIG. 8 is a vertical cross-sectional view illustrating the cooling block having the sequential-type three stage flow path configuration.

FIG. 8 is a vertical cross-sectional view illustrating the cooling block having the sequential-type three stage flow path configuration.

This figure illustrates a cross section passing through center lines of the linear flow path 206*c* (upper stage flow path), the linear flow path 207*c* (intermediate stage flow path), and the linear flow path 208*c* (lower stage flow path).

In this figure, the cutting processing by the drill is performed from the left side in the figure with respect to the linear flow path 206*c*, from the right side in the figure with respect to the linear flow path 207*c* and the linear flow path 208*c*, and from a lower surface of the cooling block with respect to the connection flow path 210*b*. The linear flow path 207*c*, the linear flow path 208*c*, and the connection flow path 210*b* are closed by the closing members 220. An end of the linear flow path 206*c* is a connection port 212*b*. The linear flow path 206*b* is vertically connected to the linear flow path 206*c*, the linear flow path 207*b* is vertically connected to the linear flow path 207*c*, and the linear flow path 208*b* is vertically connected to the linear flow path 208*c*.

The above can be summarized as follows.

Since the refrigerant flow path and the connection flow path are formed by cutting processing with the drill, the cooling block has a configuration in which the flow paths having a linear central axis are connected.

The refrigerant flow path and the connection flow path are cutting holes, and ends (ends different from the connection port) other than the connection port through which the refrigerant is introduced and the connection port through which the refrigerant flows out are closed. A tip of the cutting hole is located inside the cooling block and the cutting hole does not penetrate the cooling block.

From the viewpoint of manufacturing, the refrigerant flow path and the connection flow path are desirably perpendicular to each other.

The upper stage flow path and the lower stage flow path are connected to the connection flow path in the vicinity of the outer wall surface of the cooling block or the connection port. Specifically, a distance between the central axis of the connection flow path and the outer wall surface of the cooling block or the connection port is desirably twice or less the diameter of the connection flow path. From the viewpoint of the strength of the cooling block, if the connection flow paths have a wall thickness that is not damaged by the pressure of the refrigerant, they may be brought close to the outer wall surface of the cooling block or the connection port, and the distance may be 1 times or less of the diameter.

Note that the screw members are desirably used for being embedded to the appropriate position as the closing members. In principle, the upper stage flow path, the lower stage flow path, and the intermediate flow path have the same cross-sectional area by processing with the same drill, but as for the connection flow path, as will be described below, a drill having a diameter smaller than that of the other flow paths may be used if necessary.

In this processing example, a case where the refrigerant flow path has a three stage configuration has been described, but also in a case of a two stage configuration or a four or more stage flow path configuration, a processing method does not change.

The protrusions sandwiching the slit provided in the side surface of the cooling block are used to pass a bolt through the protrusions and fasten the bolt in order to bring the outer peripheral wall of the anode cylindrical body and the cooling block into close contact with each other.

Note that the cooling block may be manufactured without providing the slit and the protrusions.

When a height of the cooling block is made relatively small with respect to a height of the anode cylindrical body, for example, for the purpose of reducing material costs and due to the convenience of an installation space, the closing member with a small size of the connecting flow path is used, and as a result, a diameter of the closing member is also small. Along with this, the cross-sectional area of the connection flow path may be made smaller than the cross-sectional areas of the upper stage flow path, the lower stage flow path, and the intermediate stage flow path. It is desired that the cross-sectional area of the connection flow path be equal to or smaller than those of the upper stage flow path, the lower stage flow path, and the intermediate flow path (be equal to or smaller than the cross-sectional area of the refrigerant flow path) with reference to a cross section perpendicular to the central axis of the flow path.

An overall shape of the cooling block is desirably a quadrangular prism, and it is desired that the refrigerant flow paths (upper stage flow path, lower stage flow path, intermediate flow path) provided at different positions in the vertical direction be formed in a U shape from a predetermined surface of the quadrangular prism and surround the anode cylindrical body.

Second Embodiment

An embodiment of the industrial magnetron using the cooling block described in a first embodiment as a cooling unit and further including a refrigerant storage tank will be described.

The present invention is an industrial magnetron including: an anode cylindrical body in which a plurality of anode bays are formed around a helically formed cathode filament as a heat release source to constitute a part of an anode; a cooling block disposed around the anode cylindrical body; a refrigerant storage tank disposed outside the anode cylindrical body; a refrigerant supply port for supplying a refrigerant from the refrigerant storage tank to the cooling block; an introduction port for introducing the refrigerant into the cooling block; a refrigerant supply path connecting the refrigerant supply port and the introduction port; a discharge port for discharging the refrigerant from the inside of the cooling block; a refrigerant recovery port for recovering the refrigerant into the refrigerant storage tank; and a refrigerant recovery path connecting the discharge port and the refrigerant recovery port.

The cooling block has two or more flow paths, through which the refrigerant flows, at different positions in the vertical direction inside the cooling block, a flow path having an introduction port into which the refrigerant flows is defined as a refrigerant introduction flow path, and a flow path having a discharge port through which the refrigerant is discharged is defined as a refrigerant discharge flow path. Note that the different position in the vertical direction is the positional relationship between the upper stage and the lower stage.

Figure 9:
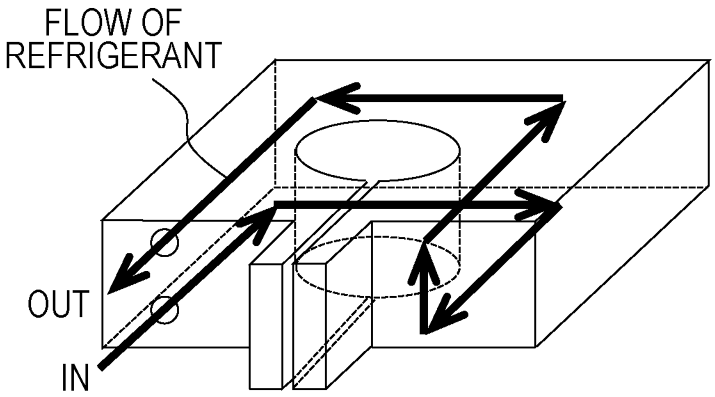
FIG. 9 is a perspective view illustrating a flow of refrigerant in the cooling block having the sequential-type two stage flow path configuration.

First, FIG. 9 illustrates a refrigerant flow (sequential type) having a two stage flow path configuration in the industrial magnetron including the cooling block in which two flow paths, that is, the refrigerant introduction flow path and the refrigerant discharge flow path are provided inside the cooling block, and are connected by the connection flow path at a position of an end different from the introduction port of the refrigerant introduction flow path and a position of an end different from the discharge port of the refrigerant discharge flow path.

In this figure, the refrigerant introduction flow path and the refrigerant discharge flow path are connected by the connection flow path at positions of the ends different from the openings of the refrigerant introduction flow path and the refrigerant discharge flow path.

The refrigerant introduction flow path and the refrigerant discharge flow path are arranged in a U shape so as to surround the outer peripheral surface of the anode cylindrical body.

The refrigerant is introduced from the connection port of the lower stage flow path, passes through the U-shaped lower stage flow path, further flows into the upper stage flow path through the connection flow path, passes through the U-shaped upper stage flow path, and flows out from the connection port of the upper stage flow path.

One end of the refrigerant introduction flow path has the opening as the introduction port for introducing the refrigerant into the cooling block. One end of the refrigerant discharge flow path has the opening as the discharge port for discharging the refrigerant from the inside of the cooling block. The cooling block includes one or more connection flow paths inside the cooling block for circulating the refrigerant introduced from the introduction port to all the flow paths including the refrigerant introduction flow path and the refrigerant discharge flow path.

The refrigerant supply device provided on the refrigerant supply path uses the refrigerant introduced from the refrigerant storage tank through the refrigerant supply path and the introduction port at a predetermined discharge pressure to cool the anode cylindrical body inside a magnetron body by the refrigerant introduction flow path, then transfers the refrigerant to the refrigerant discharge flow path to cool the anode cylindrical body by the refrigerant discharge flow path, and then recovers the refrigerant into the refrigerant storage tank through the discharge port and the refrigerant recovery flow path. This is defined as one cooling treatment, and this cooling treatment is repeated.

In this embodiment, since the refrigerant first flows around the anode cylindrical body through the refrigerant introduction flow path to cool the anode cylindrical body, and the refrigerant thermally affected by the anode cylindrical body at this point flows around the anode cylindrical body through the refrigerant discharge flow path to cool the anode cylindrical body, the maximum cooling effect cannot be obtained, but the cost required for the manufacturing processing can be suppressed.

Figure 10:
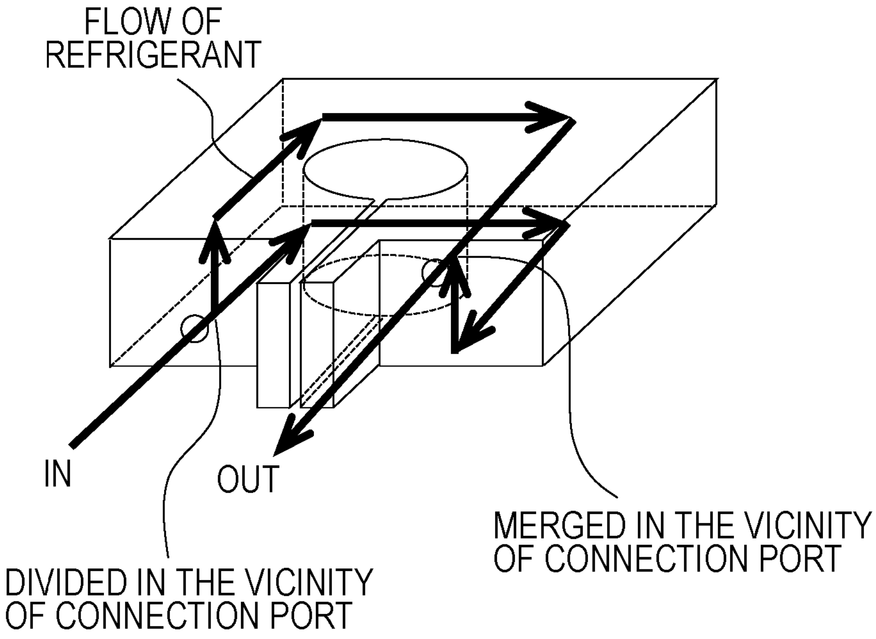
FIG. 10 is a perspective view illustrating the flow of the refrigerant in the cooling block having the dividing-and-merging type two stage flow path configuration.

FIG. 10 illustrates a refrigerant flow (dividing-and-merging type) having the two stage flow path configuration in the industrial magnetron including the cooling block having a flow path configuration in which the refrigerant introduction flow path and the refrigerant discharge flow path are connected by the first connection flow path at a position near the introduction port of the refrigerant introduction flow path, and the refrigerant introduction flow path and the refrigerant discharge flow path are connected by the second connection flow path at a position near the discharge port of the refrigerant discharge flow path.

In this flow path configuration, the refrigerant introduced from the refrigerant storage tank through the refrigerant supply path and the introduction port is divided and transferred to the refrigerant introduction flow path and the refrigerant discharge flow path before the refrigerant flows around the anode cylindrical body through the first connection flow path, to cool the anode cylindrical body inside the magnetron body by the refrigerant introduction flow path and the refrigerant discharge flow path, and is then merged through the second connection flow path, and is recovered into the refrigerant storage tank through the discharge port and the refrigerant recovery flow path. This is defined as one cooling treatment, and this cooling treatment is repeated.

The refrigerant is introduced from the connection port of the lower stage flow path, is divided into the upper stage flow path and the lower stage flow path by the first connection flow path, passes through the upper stage flow path and the lower stage flow path having a U shape, and the refrigerant in the upper stage flow path and the lower stage flow path is merged through the second connection flow path and flows out from the connection port of the upper stage flow path.

In this embodiment, before the refrigerant introduced into the cooling block flows around the anode cylindrical body to cool the anode cylindrical body, the refrigerant is divided into the refrigerant introduction flow path and the refrigerant discharge flow path, to be transferred, so that the refrigerant flowing through the refrigerant introduction flow path and the refrigerant discharge flow path can independently perform the cooling treatment without interference. Therefore, the maximum cooling effect can be expected in the flow path configuration of two stages of the upper stage and the lower stage. However, the cost required for the manufacturing processing is greater than that in the previous embodiment.

Figure 11:
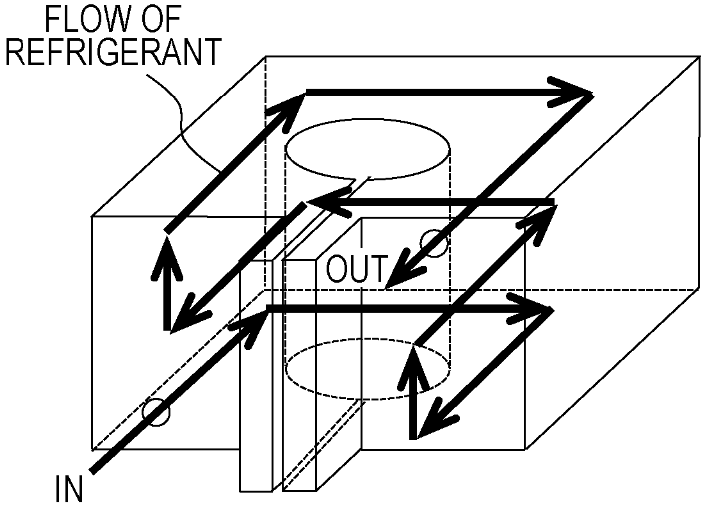
FIG. 11 is a perspective view illustrating the flow of the refrigerant in the cooling block having the sequential-type three stage flow path configuration.

Next, FIG. 11 illustrates a refrigerant flow (sequential type) having a three stage flow path configuration in the industrial magnetron including the cooling block in which three flow paths, that is, the refrigerant introduction flow path, the intermediate flow path, and the refrigerant discharge flow path are provided inside the cooling block, the position of the end different from the introduction port of the refrigerant introduction flow path and a position of one end of the intermediate flow path are connected by the first connection flow path, and a position of the other end of the intermediate flow path and the position of the end different from the discharge port of the refrigerant discharge flow path are connected by the second connection flow path.

In this flow path configuration, the refrigerant introduced from the refrigerant storage tank through the refrigerant supply path and the introduction port is used to cool the anode cylindrical body inside the magnetron body by the refrigerant introduction flow path, is then transferred to the intermediate flow path through the first connection flow path, to cool the anode cylindrical body by the intermediate flow path, is then transferred to the refrigerant discharge flow path through the second connection flow path, to cool the anode cylindrical body by the refrigerant discharge flow path, and is then recovered into the refrigerant storage tank through the discharge port and the refrigerant recovery flow path. This is defined as one cooling treatment, and this cooling treatment is repeated.

The refrigerant is introduced from the connection port of the lower stage flow path, passes through the U-shaped lower stage flow path, flows into the intermediate stage flow path through the connection flow path, passes through the U-shaped intermediate stage flow path, further flows into the upper stage flow path through the connection flow path, passes through the U-shaped upper stage flow path, and flows out from the connection port of the upper stage flow path.

In this embodiment, the refrigerant first flows around the anode cylindrical body through the refrigerant introduction flow path and cools the anode cylindrical body, the refrigerant thermally affected by the anode cylindrical body at this time is transferred to the intermediate flow path and flows around the anode cylindrical body through the intermediate flow path to cool the anode cylindrical body, and further the refrigerant thermally affected by the anode cylindrical body at this time flows around the anode cylindrical body through the refrigerant discharge flow path and cools the anode cylindrical body, so that the maximum cooling effect cannot be obtained, but the refrigerant can circulate in each cooling flow path with a predetermined discharge pressure.

Figure 12:
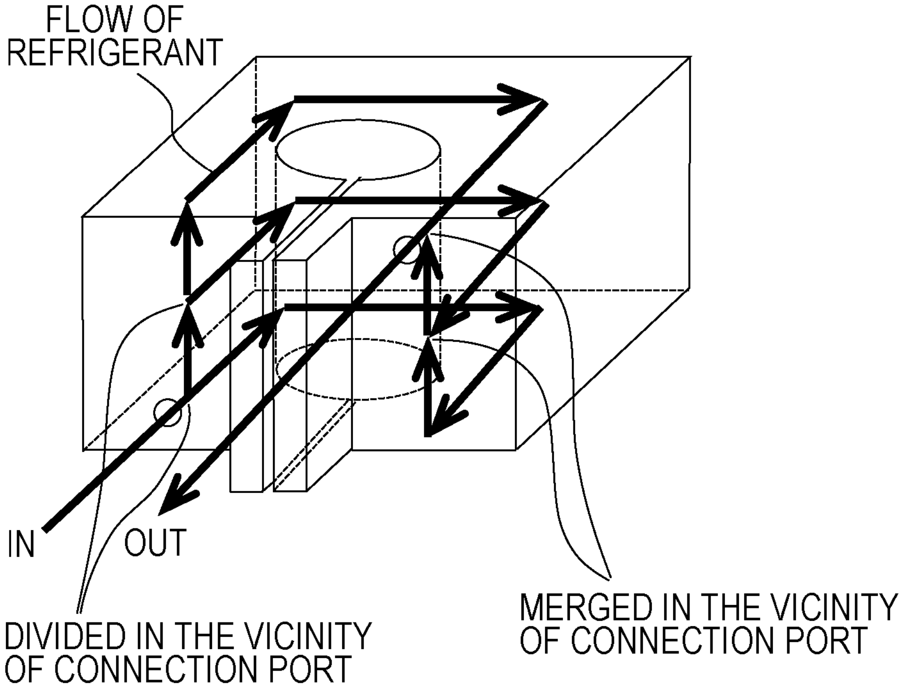
FIG. 12 is a perspective view illustrating the flow of the refrigerant in the cooling block having the dividing-and-merging type three stage flow path configuration.

FIG. 12 illustrates a refrigerant flow (dividing-and-merging type) having the three stage flow path configuration in the industrial magnetron including the cooling block having a flow path configuration in which the refrigerant introduction flow path, the intermediate flow path, and the refrigerant discharge flow path are connected by the first connection flow path at the position near the introduction port of the refrigerant introduction flow path, and the refrigerant introduction flow path, the intermediate flow path, and the refrigerant discharge flow path are connected by the second connection flow path at the position near the discharge port of the refrigerant discharge flow path.

In this flow path configuration, the refrigerant introduced from the refrigerant storage tank through the refrigerant supply path and the introduction port is divided and transferred to the refrigerant introduction flow path, the intermediate flow path, and the refrigerant discharge flow path before the refrigerant flows around the anode cylindrical body through the first connection flow path, to cool the anode cylindrical body inside the magnetron body by the refrigerant introduction flow path, the intermediate flow path, and the refrigerant discharge flow path, and is then merged through the second connection flow path, and is recovered into the refrigerant storage tank through the discharge port and the refrigerant recovery flow path. This is defined as one cooling treatment, and this cooling treatment is repeated.

The refrigerant is introduced from the connection port of the lower stage flow path, is divided into the upper stage flow path, the intermediate flow path, and the lower stage flow path by the first connection flow path, passes through the upper stage flow path, the intermediate flow path, and the lower stage flow path having a U shape, and the refrigerant in the upper stage flow path, the intermediate flow path, and the lower stage flow path is merged through the second connection flow path and flows out from the connection port of the upper stage flow path.

In this embodiment, before the refrigerant introduced into the cooling block flows around the anode cylindrical body to cool the anode cylindrical body, the refrigerant is divided into the refrigerant introduction flow path, the intermediate flow path, and the refrigerant discharge flow path, to be transferred, so that the refrigerant flowing through the refrigerant introduction flow path, the intermediate flow path, and the refrigerant discharge flow path can independently perform the cooling treatment without interference. Therefore, the maximum cooling effect can be expected in the flow path configuration of three stages of the upper stage, the intermediate stage, and the lower stage. Even when the number of the intermediate flow paths is increased to one or two stages, the refrigerant flowing through the refrigerant introduction flow path, the intermediate flow path, and the refrigerant discharge flow path can independently perform the cooling treatment without interference in the same manner.

An arrangement interval between the refrigerant introduction flow path, the intermediate flow path, and the refrigerant discharge flow path in the vertical direction is adjusted according to a heat generation state of the anode cylindrical body.

In this case, the discharge pressure of the refrigerant introduced into the cooling block by the refrigerant supply device is preferably increased in advance in order to maintain the flow rate of each of the flow paths after flow separation.

Although the refrigerant is introduced from the connection port of the lower stage flow path in examples of FIGS. 9 to 12, the cooling block and the magnetron using the cooling block of the present disclosure are not limited to this, and the refrigerant may be introduced from the connection port of the upper stage flow path. Further, a connection port may be provided in the intermediate stage flow path, and the refrigerant may be introduced from the connection port. This can be employed even if the arrangement of the connection flow paths is as illustrated in the drawings in the case of the dividing-and-merging type. Furthermore, even in the case of the configuration in which the connection port is provided in the intermediate flow path and the sequential type, the technical idea of the present disclosure can be implemented by adjusting the arrangement of the connection flow path.

When, among the two or more flow paths, a flow path located uppermost in the vertical direction is defined as the upper stage flow path, and a flow path located lowermost in the vertical direction is defined as the lower stage flow path, the connection port is provided at one end of each of the upper stage flow path and the lower stage flow path, and the cooling block has a configuration in which the refrigerant is introduced from the connection port of the lower stage flow path and is discharged from the connection port of the upper stage flow path, or a configuration in which the refrigerant is introduced from the connection port of the upper stage flow path and is discharged from the connection port of the lower stage flow path.

Figure 13:
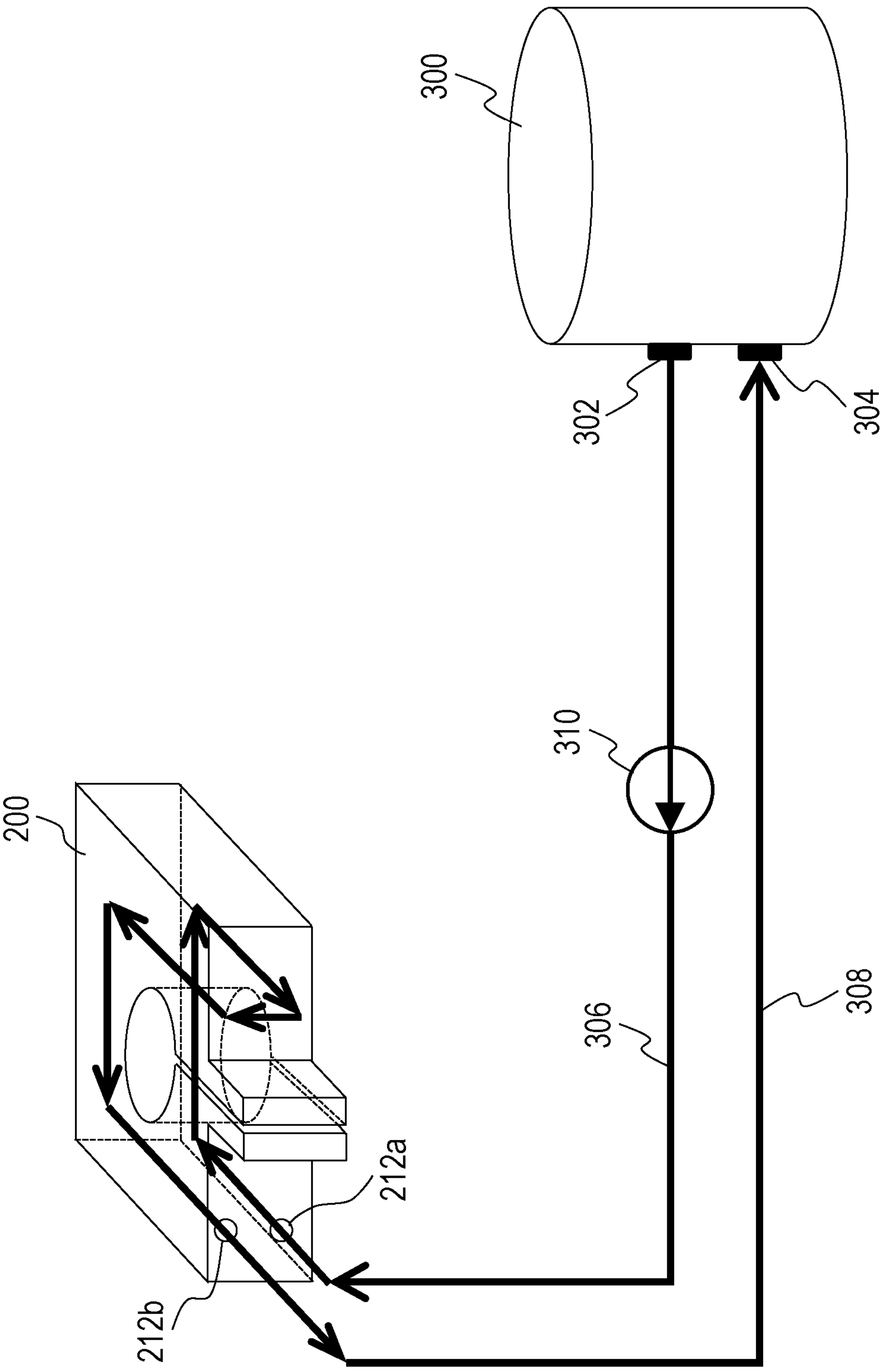
FIG. 13 is a schematic configuration diagram illustrating a cooling system for an industrial magnetron.

FIG. 13 is a schematic configuration diagram illustrating a cooling system for the industrial magnetron.

In this figure, the industrial magnetron includes, as the cooling system, the cooling block 200, a refrigerant storage tank 300, a refrigerant supply path 306 and a refrigerant recovery path 308 connecting the cooling block and the refrigerant storage tank, and a refrigerant supply device 310 (refrigerant pump) provided in the refrigerant supply path 306. Note that in order to clarify the cooling system, components such as the anode cylindrical body are omitted in this figure.

The cooling block 200 has the sequential-type two stage flow path configuration, and the refrigerant is introduced from the connection port 212*a* of the lower stage flow path. The refrigerant supply path 306 connects a refrigerant supply port 302 of the refrigerant storage tank 300 and the connection port 212*a* of the lower stage flow path. The refrigerant recovery path 308 connects a refrigerant recovery port 304 of the refrigerant storage tank 300 and the connection port 212*b* of the upper stage flow path. Note that water is usually used as the refrigerant.

The refrigerant storage tank 300 desirably includes a heat exchanger (not illustrated) such as a chiller inside or outside the refrigerant storage tank. The heat exchanger cools the recovered refrigerant.

The recovered refrigerant is cooled to a predetermined temperature by the heat exchanger and stored in the refrigerant storage tank 300. Then, the refrigerant is supplied to the inside of the cooling block 200 through the refrigerant supply path 306 at a predetermined discharge pressure by the refrigerant supply device 310. In this way, the refrigerant circulates between the cooling block 200 and the refrigerant storage tank 300. Note that the refrigerant supply device 310 may be built in the refrigerant storage tank 300.

Hereinafter, the embodiments of the present disclosure will be described from another aspect.

The present invention provides a columnar cooling block having a space into which the anode cylindrical body of the magnetron is inserted, in which the columnar cooling block includes two or more refrigerant flow paths provided at different positions in the vertical direction and at least one or more connection flow paths connecting the two or more refrigerant flow paths, the columnar cooling block has a configuration in which the two or more refrigerant flow paths are connected in series by the connection flow paths or a configuration in which the two or more refrigerant flow paths are connected in parallel by the connection flow paths, and the columnar cooling block removes heat generated in the anode cylindrical body by supplying the refrigerant to the refrigerant flow paths.

According to the present invention, in the cooling block used for cooling the magnetron, the number of external components can be reduced, and the probability that the refrigerant leaks can be reduced.

What is claimed is:

1. A cooling block formed in a columnar shape in an outer periphery of an anode cylindrical body of a high power industrial magnetron, wherein the cooling block comprises at different positions in a vertical direction, two or more flow paths through which refrigerant flows, and the flow paths closest to each other in the vertical direction indicating a direction of a central axis of an anode cylindrical body insertion portion of the industrial magnetron are connected to each other by at least one or more connection flow paths in the cooling block, when, among the two or more flow paths, a flow path located uppermost in the vertical direction is referred to as an upper stage flow path, and a flow path located lowermost in the vertical direction is referred to as a lower stage flow path, a connection port is provided at one end of each of the upper stage flow path and the lower stage flow path, and the cooling block has a configuration in which the refrigerant is introduced from the connection port of the lower stage flow path and is discharged from the connection port of the upper stage flow path, or a configuration in which the refrigerant is introduced from the connection port of the upper stage flow path and is discharged from the connection port of the lower stage flow path, the upper stage flow path and the lower stage flow path are connected to the at least one or more connection flow paths in the vicinity of the connection ports.

2. The cooling block according to claim 1, wherein a cooling capacity of the cooling block is changed by a number of intermediate flow paths arranged at intermediate positions in the vertical direction between the upper stage flow path and the lower stage flow path.

3. The cooling block according to claim 2, wherein the upper stage flow path, the lower stage flow path, and the number of intermediate flow paths have the same cross-sectional area, and the cross-sectional area of the at least one or more connection flow paths is equal to or smaller than that of the upper stage flow path, the lower stage flow path, and the number of intermediate flow paths.

4. The cooling block according to claim 2, wherein the columnar shape is a quadrangular prism, and the upper stage flow path, the lower stage flow path, and the number of intermediate flow paths are formed in a U shape from a predetermined surface of the quadrangular prism, and surrounds the anode cylindrical body, the upper stage flow path and the lower stage flow path are closed at ends different from the connection ports, and both ends of the number of intermediate flow paths are closed.

5. An industrial magnetron comprising the cooling block according to claim 1 in an outer periphery of the industrial magnetron, wherein the industrial magnetron comprises, inside the cooling block, a refrigerant introduction flow path having at least at one endue an opening as an introduction port for introducing refrigerant into the cooling block, and a refrigerant discharge flow path having at one end an opening as a discharge port for discharging the refrigerant from inside the cooling block, the refrigerant introduction flow path is one of the two or more flow paths, the refrigerant discharge flow path is another one of the two or more flow paths, and the industrial magnetron comprises, inside the cooling block, the one or more connection flow paths that allow the refrigerant introduced from the introduction port to flow through all the flow paths including the refrigerant introduction flow path and the refrigerant discharge flow path.

6. The industrial magnetron according to claim 5, wherein the industrial magnetron comprises:

a refrigerant storage tank having a heat exchange unit and storing the refrigerant while holding the refrigerant at a predetermined temperature;

a refrigerant supply path for connecting a refrigerant supply port of the refrigerant storage tank for supplying the refrigerant to the introduction port;

a refrigerant recovery flow path for connecting a refrigerant recovery port of the refrigerant storage tank for recovering the refrigerant at the discharge port; and a refrigerant supply device for transferring the refrigerant at a predetermined discharge pressure from the refrigerant supply port to the introduction port through the refrigerant supply path.

7. The industrial magnetron according to claim 6, wherein the at least one or more connection flow paths connects the refrigerant introduction flow path and the refrigerant discharge flow path at a position of an end different from the opening of each of the refrigerant introduction flow path and the refrigerant discharge flow path, and cooling processing is repeated in which the refrigerant introduced from the refrigerant storage tank through the refrigerant supply path and the introduction port is transferred to the refrigerant discharge flow path after cooling the anode cylindrical body inside a main body of the magnetron by the refrigerant introduction flow path, and after cooling the anode cylindrical body by the refrigerant discharge flow path, the refrigerant is recovered in the refrigerant storage tank through the discharge port and the refrigerant recovery flow path.

8. The industrial magnetron according to claim 7, wherein a first connection flow path connects the refrigerant introduction flow path and the refrigerant discharge flow path at a position adjacent to the introduction port of the refrigerant introduction flow path, a second connection flow path connects the refrigerant introduction flow path and the refrigerant discharge flow path at a position adjacent to the discharge port of the refrigerant discharge flow path, the first connection flow path is one of the at least one or more connection flow paths, the second connection flow path is another one of the at least one or more connection flow paths, and cooling processing is repeated in which the refrigerant introduced from the refrigerant storage tank through the refrigerant supply path and the introduction port is divided and transferred to the refrigerant introduction flow path and the refrigerant discharge flow path before the refrigerant flows around the anode cylindrical body through the first connection flow path, and after cooling the anode cylindrical body inside a main body of the magnetron by the refrigerant introduction flow path and the refrigerant discharge flow path, the refrigerant merges through the second connection flow path and is recovered in the refrigerant storage tank through the discharge port and the refrigerant recovery flow path.

9. The industrial magnetron according to claim 7, further comprising an intermediate flow path at an intermediate position between the refrigerant introduction flow path and the refrigerant discharge flow path, wherein a first connection flow path connects the refrigerant introduction flow path, the intermediate flow path, and the refrigerant discharge flow path at a position adjacent to the introduction port of the refrigerant introduction flow path, a second connection flow path connects the refrigerant introduction flow path, the intermediate flow path, and the refrigerant discharge flow path at a position adjacent to the discharge port of the refrigerant discharge flow path, the first connection flow path is one of the at least one or more connection flow paths, the second connection flow path is another one of the at least one or more connection flow paths, the intermediate flow path is still another one of the two or more flow paths, and cooling processing is repeated in which the refrigerant introduced from the refrigerant storage tank through the refrigerant supply path and the introduction port is divided and transferred to the refrigerant introduction flow path, the intermediate flow path, and the refrigerant discharge flow path before the refrigerant flows around the anode cylindrical body through the first connection flow path, and after cooling the anode cylindrical body inside a main body of the magnetron by the refrigerant introduction flow path, the intermediate flow path, and the refrigerant discharge flow path, the refrigerant merges through the second connection flow path and is recovered in the refrigerant storage tank through the discharge port and the refrigerant recovery flow path.

* * * * *